United States Patent

Beaney

[15] 3,642,503
[45] Feb. 15, 1972

[54] PROCESS FOR BONDING PARTICULATE MATERIALS

[72] Inventor: Peter Austin Beaney, Birmingham, England

[73] Assignee: Foseco International Limited, Birmingham, England

[22] Filed: June 8, 1970

[21] Appl. No.: 44,637

Related U.S. Application Data

[63] Continuation of Ser. No. 815,976, Apr. 14, 1969, abandoned, which is a continuation-in-part of Ser. No. 611,232, Jan. 24, 1967, abandoned.

[52] U.S. Cl. ............................... 106/38.35, 106/74, 106/77, 106/84
[51] Int. Cl. ........................................................... B28b 7/34
[58] Field of Search ..................... 106/38.3, 38.35, 38.7, 74, 106/82, 76, 77, 287 A, 84

[56] References Cited

UNITED STATES PATENTS

| | | | |
|---|---|---|---|
| 2,492,790 | 12/1949 | Farkas et al. | 106/74 |
| 3,149,985 | 9/1964 | Gandon | 106/74 |
| 3,424,600 | 1/1969 | Liass et al. | 106/38.35 |
| 3,493,406 | 2/1970 | Fillet | 106/74 |
| 2,883,723 | 4/1959 | Moore et al. | 106/38.3 X |

Primary Examiner—Lorenzo B. Hayes
Attorney—Wolfe, Hubbard, Leydig, Voit & Osann, Ltd.

[57] ABSTRACT

Silicate—bonded sand mixtures may be hardened by several known different methods. This application describes a further method of hardening the mixture by the incorporation therein of mixture of diacetin and triacetin.

8 Claims, No Drawings

PROCESS FOR BONDING PARTICULATE MATERIALS

CROSS REFERENCE TO RELATED APPLICATION

This application is a continuation-in-part of my application Ser. No. 815976 filed Apr. 14th 1969, which is itself a continuation-in-part of my application Ser. No. 611232 filed Jan. 24th 1967 both now abandoned.

This invention relates to the production of articles of bonded particulate material. It is of particular interest in the production of articles of bonded sand, and more particularly sand moulds and cores used in the foundry industry, and the invention will therefore be described with particular reference to such bonded sand articles. However the bonding procedure herein described is of general applicability and may be used, for example, in the bonding of other particulate refractory materials or particulate exothermically reacting compositions, e.g., aluminothermic compositions.

A process for the production of sand molds and cores which is well known and widely practiced consists in mixing the sand with aqueous sodium silicate, molding the mixture to a required shape and then treating it with an acid gas, usually carbon dioxide gas. It is believed that the treatment forms a silica hydrogel which acts as the bonding agent for the sand particles. The results is that the composition hardens in its molded shape. The method is extremely useful but has certain difficulties. One of these is the difficulty of ensuring that the carbon dioxide gas has reactive access to the silicate. The gas is injected at several points into the shaped mass of sand/silicate composition but in the case of large molds and cores it is difficult to ensure that the gas reaches all parts of the article so that complete hardening is difficult to achieve. Moreover when only small molds or cores are being made there is a tendency to overgas the product and when this happens the end product tends to be somewhat friable. Of course the method has the basic disadvantage that it requires the provision of a supply of carbon dioxide gas—usually from cylinders—at the site where the molds or cores are being made.

Because of the foregoing difficulties alternatives to the foregoing method have been sought and in recent years two alternatives have been proposed.

In one of these alternatives there is used as the binder an alkali metal silicate (usually sodium silicate) together with silicon present as elemental silicon or in the form of a silicon alloy such as ferrosilicon. It is believed that the following chemical reactions take place:

a. $Na_2O \cdot SiO_2 + H_2O \rightarrow SiO_2 + 2NaOH$
b. $2NaOH + Si + H_2O \rightarrow Na_2O \cdot SiO_2 + 2H_2$ It will be observed that the equilibrium of reaction (a) is disturbed by the presence of silicon, leading to reaction (b) with the result that the product hardens, and this is achieved without a gassing operation.

Unfortunately the reactions appear to proceed only very slowly, especially in the initial stages so that it is frequently necessary to allow up to 24 hours for the full hardening of the product. The following is illustrative of the process: A mixture was made up of the following, by weight,

| | |
|---|---|
| Sodium silicate solution ($Si_2O \cdot Na_2O$ ratio 2:1; 50% solids) | 4% |
| ferrosilicon (−200 BSS Mesh) | 1.05% |
| fine silica sand | 94.5% |

It was found that the compression strength of the product scarcely increased during the first 2 hours of the life of the mixture, increased to 130-15- p.s.i. by the end of 4 hours and reached 800 p.s.i. at the end of 24 hours. Whilst the strength at the end of 4 hours was enough to enable the product to be used in metal casting, the products obtained were found to have the disadvantage that, after use, they were difficult to break down, i.e., the cores in particular were very difficult to remove from the solidified casting.

A further alternative process which has been proposed involves the use of dicalcium silicate with the alkali metal silicate solution. The reactions in this case are believed to be represented as follows:

c. $xNa_2O \cdot SiO_2 + (y+1)H_2O \rightarrow 2xNaOH + xSiO_2 \cdot yH_2O$
d. $2CaO \cdot SiO_2 + xSiO_2 \cdot yH_2O \rightarrow 2(CaO \cdot SiO_2) + (x-1)SiO_2 \cdot yH_2O$ Tests on this process show that the automatic hardening (i.e., without gassing) is even slower than with the first alternative. Thus the following composition was made up, by weight.

| | |
|---|---|
| Sodium silicate solution ($SiO_2 \cdot Na_2O$ ratio 2:1; 50% solids) | 4% |
| Dicalcium silicate | 1.5% |
| Fine silica sand | 94.5% |

The compression strength of this product after 3 hours was found to be 70 to 80 p.s.i. and even after 24 hours the compression strength had only reached 300 p.s.i. The breakdown properties of these products were however an improvement over those of the product of the first alternative.

It will thus be observed that neither of the foregoing processes is entirely satisfactory and that the processes are of little utility where, as is often the case, sand molds or cores are required at short notice.

According to one solution of the foregoing difficulties there is provided a method for the production of a bonded particulate material which comprises forming a mixture of the said particulate material with aqueous alkali metal silicate, silicon, dicalcium silicate and lime, shaping the resulting mixture and allowing it to harden in said shape.

More particularly the foregoing method is employed for the production of sand molds and cores for foundry use by forming a mixture of the sand with aqueous alkali metal silicate, silicon, dicalcium silicate and lime, shaping the resulting mixture to the required shape for a mold or core, and allowing it to harden.

An alternative improved process for the production of a bonded particulate material comprises forming a mixture of the said particulate material with aqueous alkali metal silicate and calcium sulphate, shaping the resulting mixture and allowing it to harden in the said shape.

There may be included in the aforesaid mixture an organic additive to retard the setting of the binder. Preferably according to the last-mentioned method the particulate material is sand, the organic additive, when used, is glucose or dextrose and the mixture is formed into the shape of a mold or core for foundry purposes. The aqueous alkali metal silicate is preferably sodium silicate of an $SiO_2:Na_2O$ ratio known per se to be suitable for bonding sand e.g., a ratio of 2 to 3.3:1, the most preferred $SiO_2:Na_2O$ ratio being about 2.5:1.

Whilst the methods just referred to each have some merit, they do not entirely meet the desiderata.

According to the present invention there is provided a process for the production of a bonded particulate material which comprises forming a mixture of the said particulate material with 2 to 8 percent by weight of an aqueous alkali metal silicate having a $SiO_2$ to alkali metal oxide ratio in the range of 1.4:1 to 3.3:1, and 0.05 to 2 percent of a mixture of (A) a substance selected from monoacetin and diacetin with (B) a substance selected from triacetin and ethylene glycol diacetate, the said mixture comprising 0.2 to 10 parts by weight of (B) per part by weight of (A), shaping the resulting mixture and allowing it to harden in the said shape. Monoacetin, diacetin and triacetin are respectively glycerol monoacetate, glycerol diacetate and glycerol triacetate. The aqueous alkali metal silicate preferably has a specific gravity of 1.2 to 1.7 though stronger or more dilute solutions can be used.

It will be noted that the method of the invention is restricted to the use of the specific mixture of <u>monoacetin or diacetin and either tracetin or ethylene glycol diacetate</u>. Other mixtures of glycerol esters or of glycol esters, which have been tested have failed to give comparably valuable results, e.g., the same results are not obtained using a mixture of monoacetin and diacetin.

It is found that if there is used, instead of a mixture as just defined, the single substance monoacetin or diacetin, an extremely rapid reaction with the alkali metal silicate takes place. The "shelf-life" of the composition is thus so short that it is impracticable to employ it, e.g., there is insufficient time available between the operations of mixing the composition and the step of actually forming molds and cores from it.

If on the other hand one uses triacetin alone or ethylene glycol diacetate alone the reaction is so slow that hardening is retarded and there has to be an undesirably long lapse of time before the shaped article can be removed from the mold, core box or the like in which it is formed.

On the other hand by using monoacetin or diacetin and either triacetin or ethylene glycol diacetate in admixture, it is possible to secure the desired conditions of a sufficiently rapid hardening and a sufficient shelf life. The effects of the two substances are not however purely additive or linearly compensatory, but on the contrary the substances used together are found to act in a synergistic sense.

This whole effect is totally unexpected since, though comparable results are obtained using ethylene glycol diacetate instead of triacetin, other mixtures of glycerin esters e.g., a mixture of monoacetin and diacetin to the exlusion of triacetin or the analogous glycol esters e.g., ethylene glycol monoacetate, have failed to give good results. Comparative data is given in the examples which follow.

In accordance with the present invention it is preferred to employ a mixture of monoacetin or diacetin and triacetin or ethylene glycol diacetate comprising 0.25 to 2 parts of triacetin or ethylene glycol diacetate per part of monoacetin or diacetin, by weight.

The proportion of a said mixture included in the molding composition may vary as indicated above but is preferably in the range of 8 to 20 percent based on the weight of the alkali metal silicate.

The compositions may contain other additives e.g., any of these referred to herein for addition to alkali metal silicate/particulate material compositions, e.g., silicon, dicalcium silicate or anhydrite. Of these dicalcium silicate is preferred. Commercial alkali metal silicate solutions sold for foundry purposes often include a proportion of sugar as a breakdown additive and such sugar-containing alkali metal silicates may be used in the present invention. A sugar or other breakdown additive may be added per se to the composition.

The following examples will serve to illustrate the invention:

EXAMPLE 1

The following compositions were prepared:

| i. | Silica sand | (AFS fineness No. 55) | 96.08% |
| | Sodium silicate solution | (SiO$_2$:Na$_2$O 2.5:1 by weight, specific gravity 1.5) | 3.50% |
| | Diacetin/triacetin mixture | (1:1 by weight) | 0.42% |
| ii. | Silica sand | (AFS fineness No. 55) | 96.29% |
| | Sodium silicate solution | (SiO$_2$:Na$_2$O 2.5:1 by weight, specific gravity 1.5) | 3.50% |
| | Diacetin | | 0.21% |
| iii. | Silica sand | (AFS fineness No. 55) | 96.29% |
| | Sodium silicate solution | (SiO$_2$:Na$_2$O 2.5:1 by weight specific gravity 1.5) | 3.50% |
| | Triacetin | | 0.21% |

These compositions were used to prepared standard AFS cylindrical cores. The compressive strength of the cores was then measured at intervals with the following results.

| Time (hours) | Compressive strength (p.s.i.) | | |
|---|---|---|---|
| | i | ii | iii |
| 1 | 175 | 25 | 0 |
| 2 | 240 | 50 | 0 |
| 3 | 285 | 85 | 0 |
| 5 | 345 | 100 | 5 |

Cores were also prepared immediately after the composition had been mixed, and then at intervals of 5 minutes over a period of 20 minutes. All the cores were allowed to stand for 4 hours and their compressive strength was then measured. The following results were obtained:

| Time cores prepared after mixing (minutes) | Compressive strength (p.s.i.) | | |
|---|---|---|---|
| | i | ii | iii |
| 0 | 295 | 100 | 5 |
| 5 | 290 | 65 | 5 |
| 10 | 260 | 35 | 5 |
| 15 | 170 | — | 5 |
| 20 | 60 | — | 5 |

EXAMPLE 2

The following compositions were prepared:

| silica sand (AFS fineness No. 55) | 96.08% |
|---|---|
| Sodium silicate (SiO$_2$:Na$_2$O 2.5:1 by weight, solution specific gravity 1.5) | 3.5% |
| diacetin/ethylene glycol diacetate (1:1.5 by weight) | 0.42% |
| silica sand (AFS fineness No. 55) | 96.332% |
| sodium silicate solution (SiO$_2$:Na$_2$O 2.5:1 by weight, specific gravity 1.5) | 3.5% |
| diacetin | 0.168% |
| silica sand (AFS fineness No. 55) | 96.248% |
| sodium silicate solution (SiO$_2$:Na$_2$O 2.5:1 by weight, specific gravity 1.5) | 3.5% |
| ethylene glycol diacetate | 0.252% |

These compositions were used to prepare standard AFS cylindrical cores. The compressive strength of the cores was then measured at intervals with the following results.

| Time (hours) | Compressive strength (p.s.i.) | | |
|---|---|---|---|
| | i | ii | iii |
| 1 | 180 | 20 | 0 |
| 2 | 255 | 45 | 5 |
| 3 | 200 | 70 | 15 |
| 5 | 360 | 90 | 65 |

Cores were also prepared immediately after the composition had been mixed, and then at intervals of 5 minutes over a period of 20 minutes. All the cores were allowed to stand for 4 hours and their compressive strength was then measured.
The following results were obtained:

| Time cores prepared after mixing (minutes) | Compressive strength (p.s.i.) | | |
|---|---|---|---|
| | i | ii | iii |
| 0 | 295 | 95 | 30 |
| 5 | 240 | 70 | 30 |
| 10 | 195 | 40 | 30 |
| 15 | 140 | 20 | 35 |
| 20 | 85 | 5 | 35 |

Analogous results are obtained if the diacetin of the foregoing examples is replaced by monoacetin.

This invention includes the process described above, the novel molding compositions comprising particulate material (preferably sand), aqueous alkali metal silicate (preferably sodium silicate) and the said mixed esters, and foundry molds and cores made therefrom.

I claim as my invention:

1. In a process for the production of a bonded particulate material which comprises forming a mixture of the said particulate material with 2 to 8 percent by weight of an aqueous alkali metal silicate having an SiO$_2$ to alkali metal oxide ratio in the range of 1.4:1 to 3.3:1 shaping the resulting mixture and allowing it to harden in said shape; the improvement comprising adding to said mixture, as a hardening additive, 0.05 to 2 percent of a mixture of (A) a substance selected from the class consisting of monoacetin and diacetin with (B) a substance selected from the class consisting of triacetin and ethylene glycol diacetate, said mixture comprising 0.2 to 10 parts by weight of (B) per part by weight of (A).

2. A process according to claim 1 wherein the aqueous alkali metal silicate has a specific gravity of 1.2 to 1.7.

3. A process according to claim 1 wherein the mixture comprises 0.25 to 2 parts of the substance (B) per part of the substance (A).

4. A process according to claim 1 wherein the proportion of said mixture present in the composition is in the range of 8 to 20 percent by weight calculated on the alkali metal silicate present.

5. A process according to claim 1 wherein the alkali metal silicate is sodium silicate.

6. A process according to claim 1 wherein the particulate material is sand.

7. A process according to claim 1 wherein the mixture additionally includes dicalcium silicate.

8. A process according to claim 1 wherein the mixture additionally includes anhydrite.

* * * * *